United States Patent
Kim et al.

(10) Patent No.: US 8,254,667 B2
(45) Date of Patent: Aug. 28, 2012

(54) METHOD, MEDIUM, AND SYSTEM IMPLEMENTING 3D MODEL GENERATION BASED ON 2D PHOTOGRAPHIC IMAGES

(75) Inventors: Keun-ho Kim, Seoul (KR); Hui Zhang, Yongin-si (KR); Do-kyoon Kim, Seongnam-si (KR); Seok-yoon Jung, Seoul (KR); Anton Konouchine, Moscow (RU); Vladimir Vezhnevets, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 924 days.

(21) Appl. No.: 12/068,123

(22) Filed: Feb. 1, 2008

(65) Prior Publication Data

US 2008/0208547 A1    Aug. 28, 2008

(30) Foreign Application Priority Data

Feb. 16, 2007   (KR) ..................... 10-2007-0016781

(51) Int. Cl.
    G06K 9/00        (2006.01)
    G06T 17/00       (2006.01)
(52) U.S. Cl. ..................................... 382/154
(58) Field of Classification Search ............... None
    See application file for complete search history.

(56) References Cited

U.S. PATENT DOCUMENTS

| | | | |
|---|---|---|---|
| 5,990,900 A | 11/1999 | Seago | |
| 2005/0053276 A1* | 3/2005 | Curti et al. | 382/154 |
| 2007/0172147 A1* | 7/2007 | Fujiwara et al. | 382/276 |

FOREIGN PATENT DOCUMENTS

| | | |
|---|---|---|
| EP | 0596518 A2 * | 11/1994 |
| JP | 07-234949 | 9/1995 |
| JP | 2004-220516 | 8/2004 |
| KR | 10-2004-0028489 | 4/2004 |
| KR | 10-2005-0009216 | 1/2005 |
| KR | 10-2005-0009226 | 1/2005 |
| KR | 10-2007-0009336 | 1/2007 |

OTHER PUBLICATIONS

F.A. Van Den Heuvel: "Object Reconstruction from a Single Architectural Image Taken with an Uncalibrated Camera," Photogrammetrie Fernerkundung Geoinformation, No. 4, 2001, pp. 247-260.

(Continued)

Primary Examiner — Brian P Werner
(74) Attorney, Agent, or Firm — Staas & Halsey LLP

(57) ABSTRACT

A modeling method, medium, and system. The modeling method identifies a object within an image by detecting edges within the image, determines a complexity of the identified object based upon detected surface orientations of the identified object relative to a defined surface of the image, selectively, based upon the determined complexity, generates one or more surfaces for a 3D model by identifying one or more vanishing points for one or more corresponding surfaces, respectively, of the identified object and respectively analyzing the identified one or more vanishing points relative to respective determined points of the one or more corresponding surfaces of the image, and generates the 3D model by combining the one or more surfaces in a 3D space.

11 Claims, 14 Drawing Sheets

OTHER PUBLICATIONS

N. Cornelis et al., "Fast Compact City Modeling for Navigation Pre-Visualization," 2006 IEEE Computer Society Conference on Computer Vision and Pattern Recognition, New York, NY, USA, Jun. 17-22, 2006.

European Search Report issued May 14, 2008 in corresponding European Patent Application No. 08151361.6-2218.

Wilczkowiak et al., "Using Geometric Constraints through Parallelepipeds for Calibration and 3D Modeling," IEEE Transactions on Pattern Analysis and Machine Intelligence, vol. 27, No. 2 Feb. 2005, p. 194-207.

Criminisi et al., "Single View Metrology," Department of Engineering Science, University of Oxford; Oxford, U.K., OX1 3PJ, 1999.

Byong Mok Oh et al., "Image-based Modeling and Photo Editing," Laboratory for Computer Science Massachusetts Institute of Technology, 2001.

Hoiem et al., "Automatic Photo Pop-up," Carnegie Mellon University, 2002.

* cited by examiner

FIG. 4B
 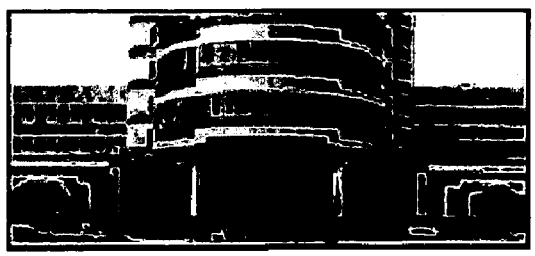
(a)  (b)
FIG. 4C
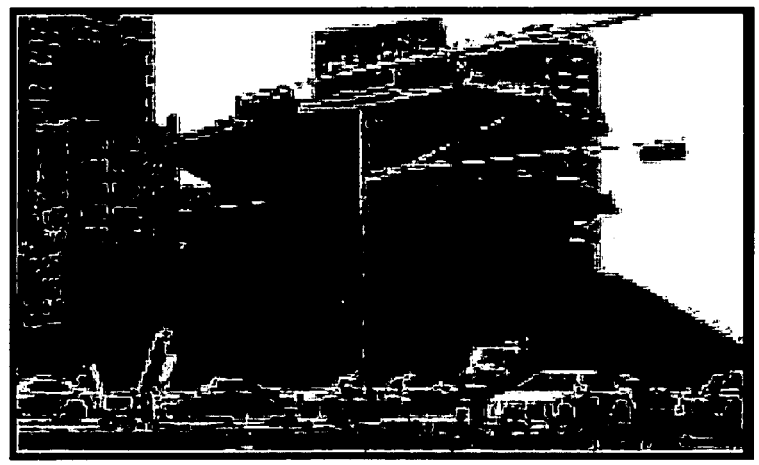

METHOD, MEDIUM, AND SYSTEM IMPLEMENTING 3D MODEL GENERATION BASED ON 2D PHOTOGRAPHIC IMAGES

CROSS-REFERENCE TO RELATED APPLICATIONS

This application claims the benefit of Korean Patent Application No. 10-2007-0016781, filed on Feb. 16, 2007, in the Korean Intellectual Property Office, the disclosure of which is incorporated herein in its entirety by reference.

BACKGROUND

1. Field

One or more embodiments of the present invention relate to image processing, e.g., in a computer vision field, and more particularly, to a method, medium, and system implementing a 3-dimensional (3D) model generation from a 2-dimensional (2D) photographic image.

2. Description of the Related Art

In relation to 3D modeling, researchers have typically focused in the computer graphics or computer vision fields. For example, in the computer graphics field, research has been performed with the aim of developing a precision computer aided design (CAD) system for modeling geometric information and material information of an object in a 3D space. However, here, the conventional techniques have problems in generating photographic images because geometric information in the real world is very complicated and it is difficult to accurately model illumination effects.

In the computer vision field, for example, research has been performed in which 3D geometric information is calculated from a 2D image, and by using an actual image, with texture information of an object under real world illumination conditions being calculated. As an example, such conventional techniques of calculating 3D geometric information from a 2D image include "Single view metrology" (Criminisi, 1999), "Image-based modeling and photo editing" (Byong Mok Oh, 2001), and "Using Geometric Constraints Through Parallelepipeds for Calibration and 3D Modelling" (Wilczkowiak, 2005). However, these techniques present a further problem in that calculations for obtaining 3D geometric information are very complicated.

An "automatic photo pop-up" technique has been proposed by Derek Hoeim in 2002 and requires very simple calculations compared to the above techniques. The Hoeim technique is based on a pop-up book for children in which if the book is opened, a picture pops up. That is, according to the technique, a 2D photographic image is divided into a ground area, a vertical area, and a sky area, and boundaries between the ground area and the vertical area in the image are estimated. Then, with the estimated boundaries as references, objects forming the 2D photographic image are cut and folded, thereby generating a 3D model. However, this technique also has a problem in that if the boundaries between the ground and vertical objects are not correctly set, an accurate 3D model cannot be obtained. For example, if the object is a building, a car may exist between the building and the ground, and due to the existence of the car between the building and ground, the boundary between the ground area and the vertical area may be set incorrectly.

SUMMARY

One or more embodiments of the present invention provides a system, method, medium, and system implementing an easy calculation for obtaining 3D geometric information in a process of generating a 3D model, e.g., such that even when a car exists between a building and the ground, such a 3D model can be accurately generated.

Additional aspects and/or advantages will be set forth in part in the description which follows and, in part, will be apparent from the description, or may be learned by practice of the invention.

To achieve the above and/or other aspects and advantages, embodiments of the present invention include a modeling method, including identifying a object within an image by detecting edges within the image, determining a complexity of the identified object based upon detected surface orientations of the identified object relative to a defined surface of the image, selectively, based upon the determined complexity, generating one or more surfaces for a 3D model by identifying one or more vanishing points for one or more corresponding surfaces, respectively, of the identified object and respectively analyzing the identified one or more vanishing points relative to respective determined points of the one or more corresponding surfaces of the image, and generating the 3D model by combining the one or more surfaces in a 3D space.

To achieve the above and/or other aspects and advantages, embodiments of the present invention include a modeling method, including identifying a object within an image by detecting edges within the image, generating one or more surfaces for a 3D model by identifying one or more vanishing points for one or more corresponding surfaces, respectively, of the identified object and respectively analyzing the identified one or more vanishing points relative to respective determined points of the one or more corresponding surfaces of the image and a corresponding determined line within each of the one or more corresponding surfaces, with each corresponding determined line within each respective surface being a midline across the respective surface between two edge lines substantially perpendicular to a line substantially parallel with an identified bottom surface of the image, and generating the 3D model by combining the one or more surfaces in a 3D space.

To achieve the above and/or other aspects and advantages, embodiments of the present invention include a modeling system, including an object identification unit to identify a object within an image through controlled detecting of edges within the image, an object classification unit to determine a complexity of the identified object based upon detected surface orientations of the identified object relative to a defined surface of the image, and a model generator to selectively, based upon the determined complexity, generate one or more surfaces for a 3D model by identifying one or more vanishing points for one or more corresponding surfaces, respectively, of the identified object and respectively analyzing the identified one or more vanishing points relative to respective determined points of the one or more corresponding surfaces of the image, and to generate the 3D model by combining the one or more surfaces in a 3D space.

To achieve the above and/or other aspects and advantages, embodiments of the present invention include a modeling system, including an object identification unit to identify a object within an image by controlled detecting of edges within the image, and a model generator to generate one or more surfaces for a 3D model by identifying one or more vanishing points for one or more corresponding surfaces, respectively, of the identified object and respectively analyzing the identified one or more vanishing points relative to respective determined points of the one or more corresponding surfaces of the image and a corresponding determined line within each of the one or more corresponding surfaces, with each corresponding determined line within each respective surface being a mid-line across the respective surface between two edge lines substantially perpendicular to a line substantially parallel with an identified bottom surface of the image, and to generate the 3D model by combining the one or more surfaces in a 3D space.

BRIEF DESCRIPTION OF THE DRAWINGS

These and/or other aspects and advantages will become apparent and more readily appreciated from the following description of the embodiments, taken in conjunction with the accompanying drawings of which:

FIGS. 4A through 4C illustrate a process of classifying an object, such as by an object classification unit illustrated in FIG. 1, according to an embodiment of the present invention;

DETAILED DESCRIPTION OF EMBODIMENTS

Figure 1:
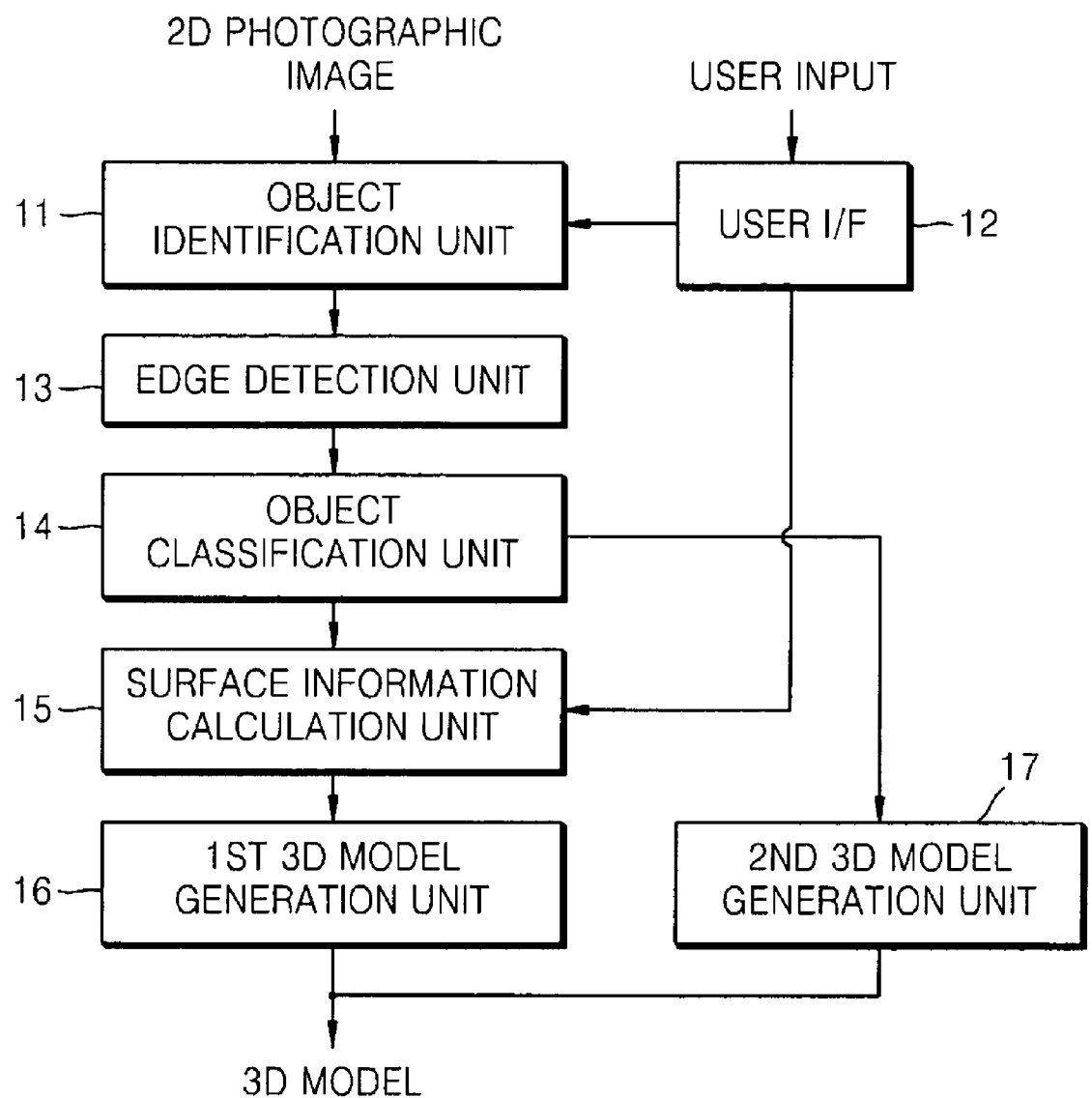
FIG. 1 illustrates a system implementing a 3-dimensional (3D) model generation, according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a system implementing a 3-dimensional (3D) model, according to an embodiment of the present invention.

Referring to FIG. 1, the system generating a 3D model may include an object identification unit 11, a user interface 12, an edge detection unit 13, an object classification unit 14, a surface information calculation unit 15, a first 3D model generation unit 16, and a second 3D model generation unit 17, for example.

The object identification unit 11 may identify at least one object included in a 2D photographic image, based on at least one of changes in image characteristics in the 2D photographic image and user input information, e.g., input through the user interface 12. That is, the object identification unit 11 may automatically identify an object based on the changes in the image characteristic in the 2D photographic image, and/or may manually identify an object based on the user input information; the term semi-automatic refers to the combined use of both automated and input information to identify an object.

In particular, here, in order to identify an object, texture from among a variety of 2D photographic image characteristics may be used. In this aspect, the texture information can include all information items, excluding geometric information, among information items for expressing a 3D model. That is, the object identification unit 11 may detect the boundary of an object corresponding to boundaries of different areas in which textures of pixels forming a 2D photographic image are different, and then identify the object based on the detection result.

Figure 2:
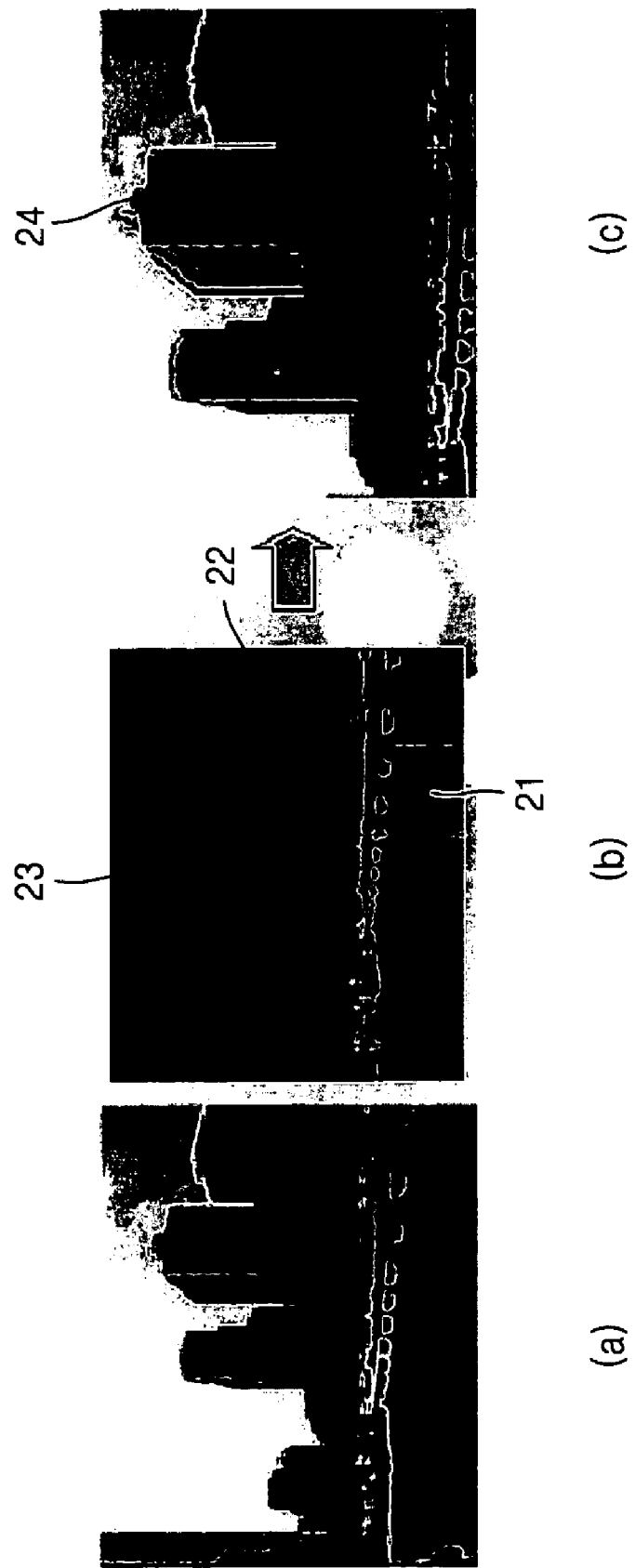
FIG. 2 illustrates, through illustrations (a)-(c), an automatic identification of an object, such as by an object identification unit illustrated in FIG. 1, according to an embodiment of the present invention.

FIG. 2, in illustrations (a)-(c), illustrates an automatic identification of an object, according to an embodiment of the present invention.

Illustration (a) of FIG. 2 is a 2D photographic image of a city center photographed by using a digital camera. This 2D photographic image captures the ground, buildings, and sky. Referring to illustration (a) of FIG. 2, it may be determined that the textures of the ground, the buildings, and the sky are very different from each other. Accordingly, the object identification unit 11, for example, may detect the boundaries of the ground, the buildings, and the sky, corresponding to boundaries of areas in which textures of pixels in the 2D photographic image are different from each other.

Illustration (b) of FIG. 2 illustrates the boundary 21 of the ground, the boundary 22 of the buildings, and the boundary 23 of the sky, e.g., as detected by the object identification unit 11. In addition, in an embodiment, by extending the boundary of the buildings to the ground, the object identification unit 11 can identify the boundary 24 of the buildings, as shown in illustration (c) of FIG. 2.

Further, the object identification unit 11 may permit manual identification of an object based on the user input information input to the user interface 12. This corresponds to a case where the user draws all boundaries of an object by using the user interface 12, for example, a touch screen input device. Thus, in an embodiment, the object identification unit 11 can identify at least one object included in a 2D photographic image, based on both changes in the image characteristics in a 2D photographic image and the user input information input to the user interface 12. Here, such a method of automatically identifying an object may be more convenient for the user, but the resultant identification speed may be slow or errors may occur. Further, a method of only permitting manual identification of objects imposes a heavy burden on the user.

Figure 3:
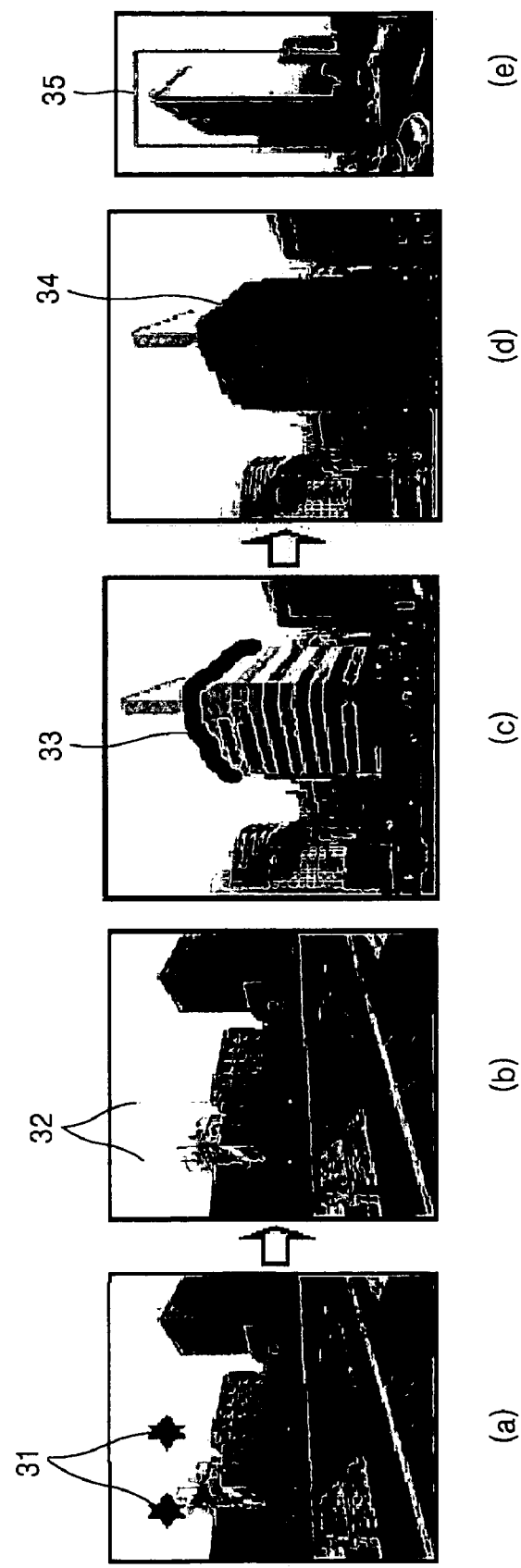
FIG. 3 illustrates, through illustrations (a)-(e), a semi-automatic identification of an object through user search area selection, such as by an object identification unit illustrated in FIG. 1, according to an embodiment of the present invention.

FIG. 3, in illustrations (a)-(e), illustrates such a semi-automatic identification of an object, according to an embodiment of the present invention.

Referring to illustration (a) of FIG. 3, a user may specify a search area 31 for identifying an object in the 2D photographic image, such as by using the user interface 12. Accordingly, the object identification unit 11 may identify an object only within the search area specified by the user input information, thereby more quickly identifying the object compared to the fully automatic method. Illustration (b) of FIG. 3 illustrates an example left and right boundaries 32 of an object identified based on a search area specified by the user.

Referring to illustration (c) of FIG. 3, the user may further draw the top line 33 for the object in the 2D photographic image, e.g., by using the user interface 12. Accordingly, the object identification unit 11 may identify an object more accurately compared to the fully automatic method, by identifying the object based on the top line 33 of the object indicated by the user input information input to the user interface 12 and changes in the texture in the 2D photographic image. Illustration (d) of FIG. 3 further illustrates a boundary 34 of the object identified based on the top line of the object drawn by the user. Illustration (e) of FIG. 3 still further illustrates a rough boundary 35 of the object, as drawn by the user. In this way, the boundary of the object can be semi-automatically identified through user interaction.

The edge detection unit 13 may be used to detect edges, e.g., indicating points in which changes in image information are equal to or greater than a threshold, for an object that is currently desired to be 3D-modeled (hereinafter referred to as a "current object") from among at least one or more objects identified by the object identification unit 11. In this case, after performing such an edge detection operation multiple times, for example, the threshold may be determined appropriately by a user or designer, based on the result of such operations. In particular, in an embodiment, in order to detect edges in the current object, luminous intensity is used from among a variety of image information items. That is, the edge detection unit 13 may detect edges indicating points in which changes in luminance are equal to or greater than a threshold. For example, a building includes many windows. Accordingly, for such a building, the edge detection unit 13 may detect the boundaries between the concrete surface of the building and the windows, corresponding to points in which changes in luminance are equal to or greater than the threshold, for example.

The object classification unit 14 may determine the complexity of the current object, e.g., based on the shape of the extended lines of the edges detected by the edge detection unit 13, and according to the thus determined complexity, the object classification unit 14 may classify the current object as one of a simple object and a complex object, for example. Generally, any one surface in a 3D space can be defined based on three surface points. Since two points correspond to one straight line, any one surface in a 3D space can be defined by one point and one straight line existing on the surface. Accordingly, if the shape of each extended line of the edges detected by the edge detection unit 13 is a straight line, and a point existing on a surface including the straight line can be determined, the surface of the building corresponding to the extended edge lines can be defined. That is, if the extended lines of the edges detected by the edge detection unit 13 are straight lines, and a surface including the extended straight lines of the edges is perpendicular to the ground surface of a 2D photographic image, the object classification unit 14 may classify the current object as a simple object. Alternatively, for example, if the object is not classified as being simple, it may be classified as a complex object.

Figure 4A:
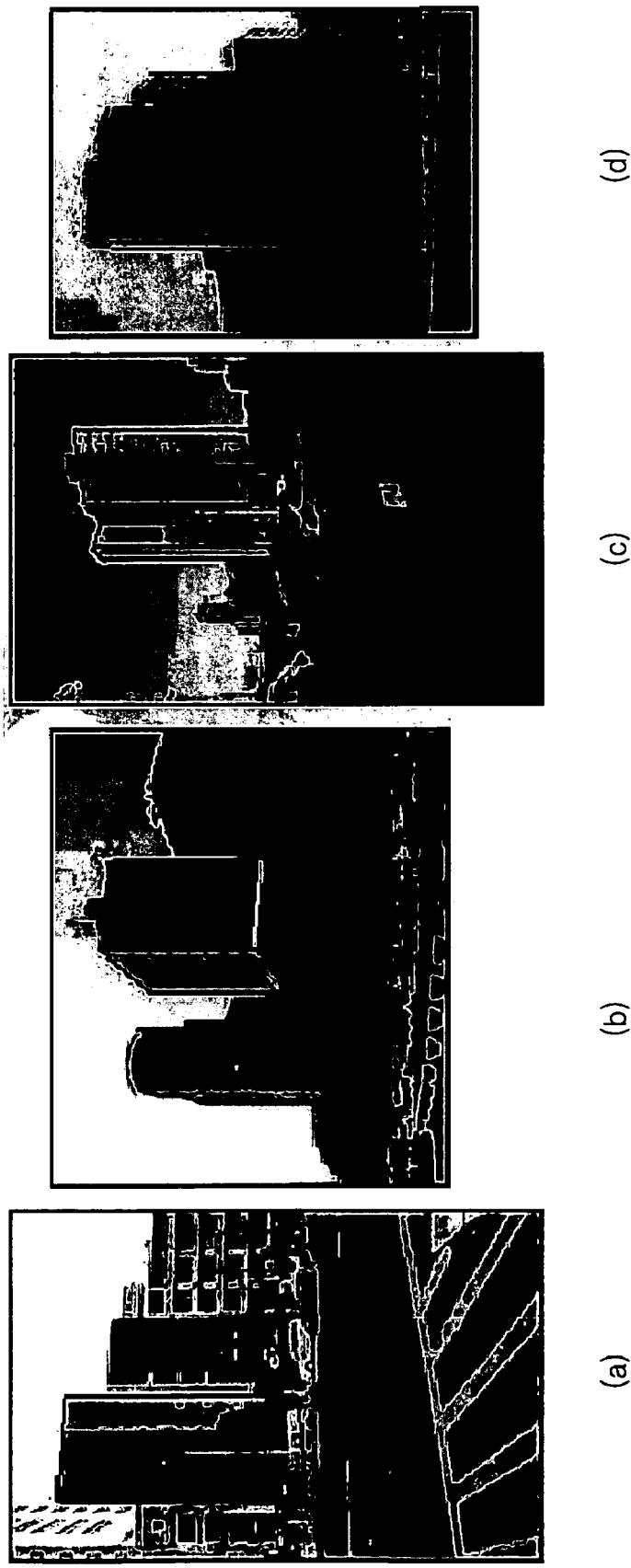

FIGS. 4A through 4C illustrate different classifying of an object, e.g., by the object classification unit 14, according to an embodiment of the present invention.

Referring to FIG. 4A, a current object illustrated in illustration (a) of FIG. 4A includes one surface perpendicular to the ground of the 2D photographic image. The current object illustrated in illustration (b) of FIG. 4A includes two surfaces perpendicular to the ground of the 2D photographic image. Further, the current object illustrated in illustrations (c) and (d) of FIG. 4A include four surfaces perpendicular to the ground of the 2D photographic image. In the objects illustrated in FIG. 4A, the shapes of extended lines of edges detected by the edge detection unit 13 are straight lines and each surface including the extended straight lines of the edges is perpendicular to the ground of the 2D photographic image. Accordingly, the objects in FIG. 4A can be classified as simple objects by the object classification unit 14, for example.

Referring to FIG. 4B, the shown current object in illustration (a) of FIG. 4B includes one surface perpendicular to the ground of the 2D photographic image and another surface that is not perpendicular to the ground. Further, the current object in illustration (b) of FIG. 4B includes surfaces perpendicular to the ground of a 2D photographic image, but the shapes of extended lines of edges detected by the edge detection unit 13 are not straight lines. Referring to FIG. 4C, among the surfaces of the current objects illustrated in FIGS. 4A-4C, some surfaces are perpendicular to the ground of the 2D photographic images and others are not perpendicular. Further, among the extended lines of the edges detected from the current objects illustrated in FIG. 4C by the edge detection unit 13, some are straight lines, and others are not straight lines.

In the objects illustrated in FIGS. 4B and 4C, the shapes of extended lines of edges detected by the edge detection unit 13 are straight lines and the surface including the extended straight lines of the edges is not perpendicular to the ground of the 2D photographic image. Accordingly, here, the objects are classified as complex objects by the object classification unit 14, for example. However, in an embodiment, the object classification criteria as described above consider whether a plane equation of a building, which will be explained later, can be calculated. Accordingly, a person of ordinary skill in the art of the present invention should further understand that if a surface equation of a building is calculated according to an additional or different technique, the object classification criteria would be correspondingly different.

Here, if the current object is classified as a simple object, the surface information calculation unit 15, for example, may detect at least one vanishing point that is a point at which the extended lines of the edges detected by the edge detection unit 13 would eventually cross each other.

Figure 5:
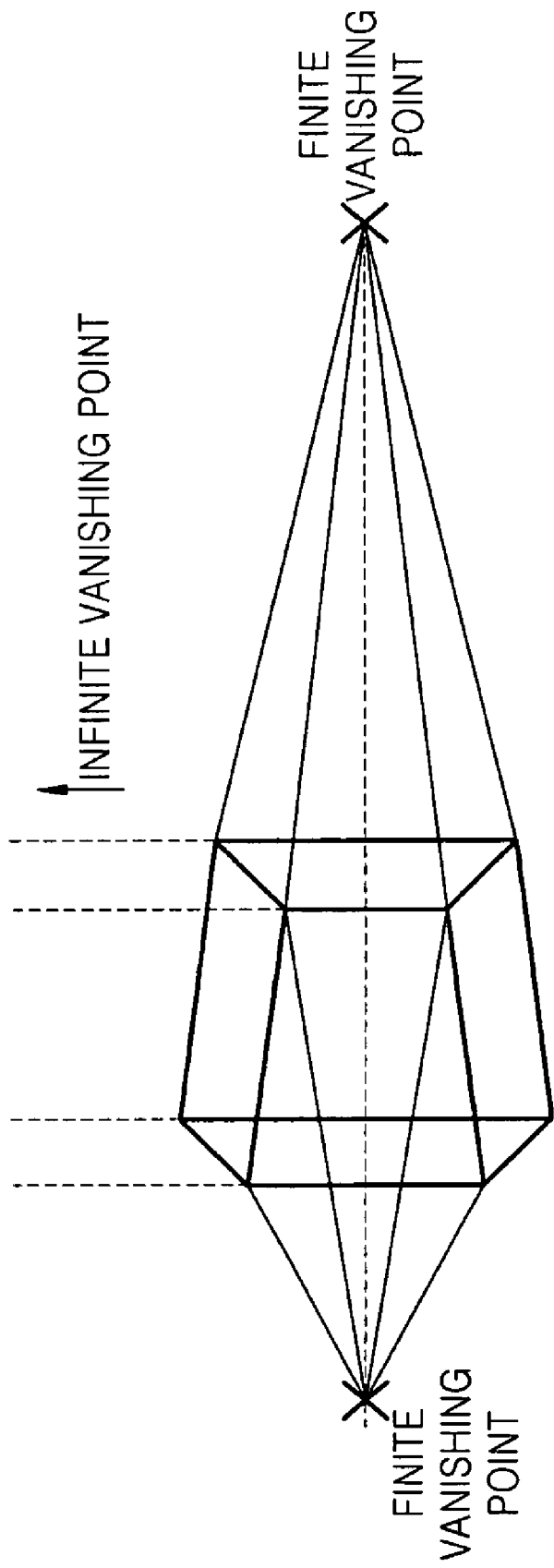
FIG. 5 is a 2-point perspective view of a cube in a 3D space.

For example, FIG. 5 illustrates a 2-point perspective view of a cube in a 3D space, according to an embodiment of the present invention.

Referring to FIG. 5, the cube in a 3D space is illustrated by using a perspective method having two vanishing points in a 2D space as references.

A perspective view can express a cubic effect because a principle of how an object is seen by the human eyes is applied to the perspective view. In particular, it can be determined that if a cube in a 3D space is projected onto a 2D plane, parallel boundaries among the boundaries of surfaces of the cube are projected as lines intersecting each other at any one common point. This common point is referred to as a vanishing point. The vanishing point may be a finite point or an infinite point in the 2D space. As illustrated in FIG. 5, horizontal boundaries that are parallel to each other among the boundaries of the surfaces of the cube have finite vanishing points, with FIG. 5 showing a vanishing point from extensions from the cube's right vertical wall's vertices and the other vanishing point being from extensions from the cube's back vertical wall's vertices behind the illustrated cube. However, vertical boundaries that are parallel with each other have infinite vanishing points. In an embodiment, a vanishing point means a finite vanishing point.

As shown, it can be determined from FIG. 5 that one vanishing point corresponds to one surface. That is, by using the geometric information of an extended edge line converging at a detected vanishing point, the surface information calculation unit 15 may calculate geometric information of an object corresponding to the detected vanishing point.

Here, in this embodiment, the geometric information of an extended edge line means a straight line equation of the extended edge line and the geometric information of a surface of an object means a plane equation of the surface of the object. However, a person of ordinary skill in the art of the present invention should understand that the geometric information of an extended edge line or a surface of an object may be geometric information of a type other than that of the equations mentioned above, in differing embodiments.

More specifically, by using a straight line equation of an extended edge line (hereinafter referred to as a "middle line") positioned closest to the center of the current object boundaries, from among extended edge lines converging at a thus detected vanishing point, and the coordinates of an arbitrary point on the boundary (hereinafter referred to as a "bottom line of a current object"), the surface information calculation unit 15 may calculate a plane equation of the surface of the object corresponding to the detected vanishing point.

In particular, if there are a plurality of vanishing points, the surface information calculation unit 15 may calculate a plane equation of a first surface corresponding to a first vanishing point, from among the plurality of vanishing points, by using a straight line equation of a middle line among the extended edge lines converging at the first vanishing point, and the coordinates of an arbitrary point on the bottom line of the first surface corresponding to the first vanishing point. In addition, the surface information calculation unit 15 may calculate a plane equation of a second surface corresponding to a second vanishing point, from among the plurality of vanishing points, by using a straight line equation of a middle line among the extended edge lines converging at the second vanishing point, and the coordinates of an arbitrary point on the bottom line of the second surface corresponding to the second vanishing point. In relation to the remaining vanishing points among the plurality of vanishing points, the same process may be again performed.

Figure 6:
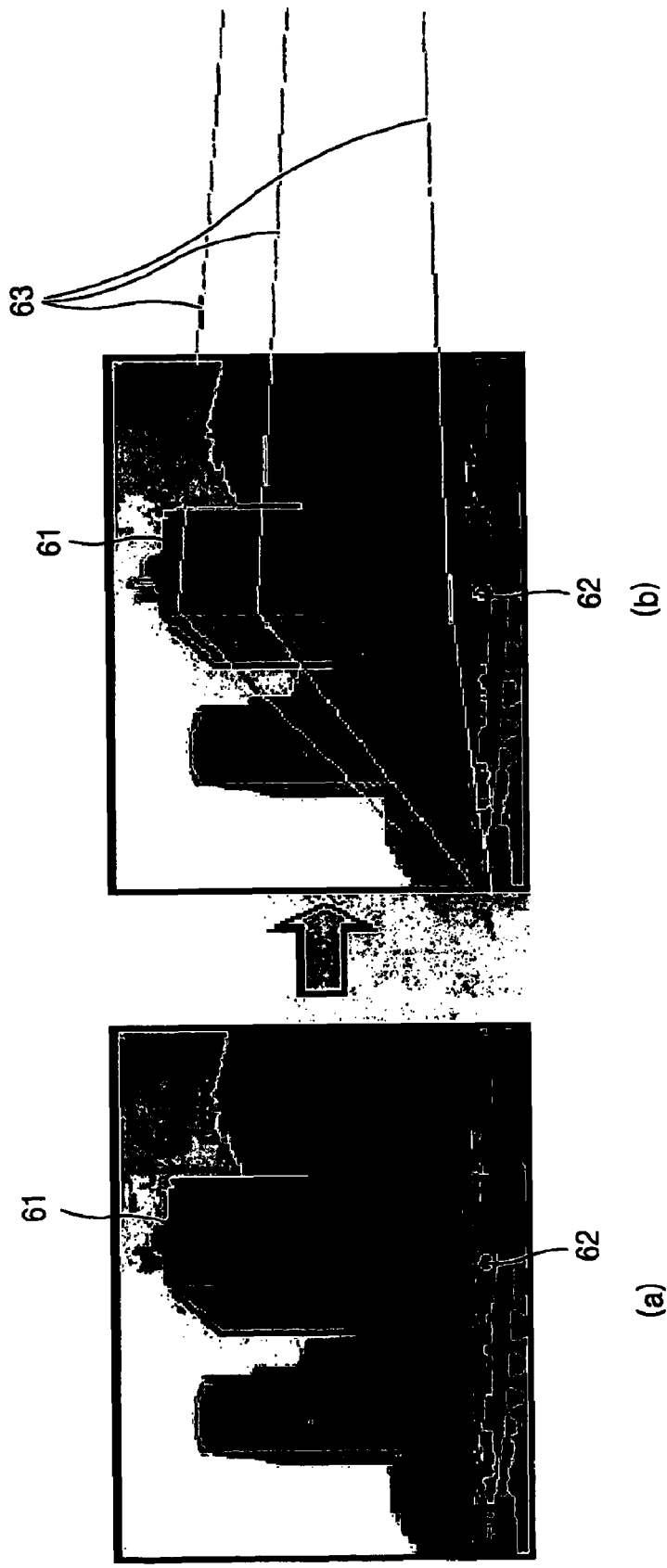
FIGS. 6 and 7 illustrate a building, explaining a method of calculating surface geometric information, such as by a surface information calculation unit illustrated in FIG. 1, according to an embodiment of the present invention.
Figure 7:
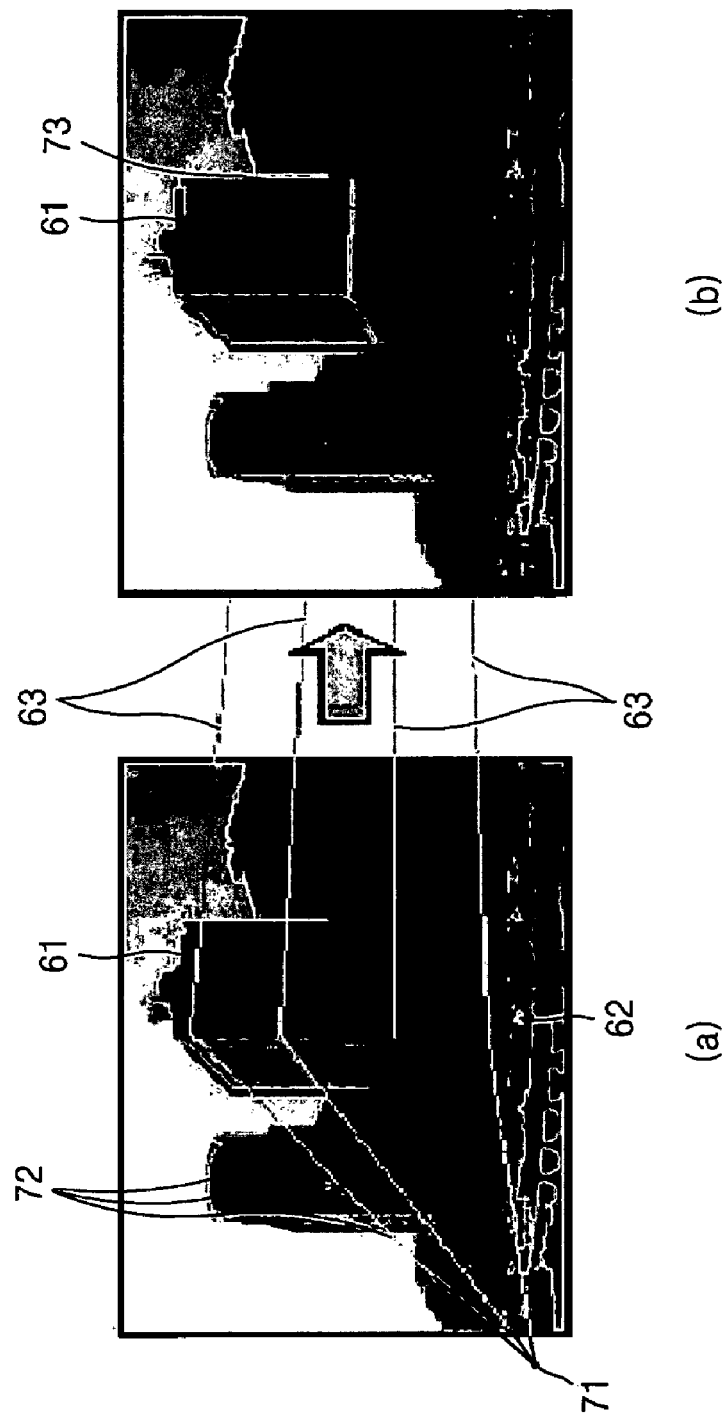

FIGS. 6 and 7 illustrate a building, explaining a method of calculating surface geometric information, such as by a surface information calculation unit illustrated in FIG. 1, according to an embodiment of the present invention.

In the illustrated portion (a) of FIG. 6, the boundaries of a current object 61, e.g., as detected by the object identification unit 11, are shown. As described above, since one surface in a 3D space is defined by one point and one straight line existing on the surface, one point on the bottom line of the current object may be determined. Accordingly, the surface information calculation unit 15 may determine one point 62 on the bottom line of the current object shown in illustrated portion (a) of FIG. 6. In particular, when it is not easy to detect the correct bottom line of a current object, e.g., because of obstacles such as a car, on the boundary between the current object and the ground, a user may specify this point 62. In this case, the surface information calculation unit 15 may determine one point 62 on the bottom line of the current object shown in illustrated portion (a) of FIG. 6 based on the user input information, e.g., as input to the user interface 12. In addition, illustrated portion (b) of FIG. 6, shows extended lines of edges detected by the edge detection unit 13. Among the extended lines of the edges, extended edge lines 63 converging at a right vanishing point (not shown) exist on the surface of the current object 61 including the point 62 determined above.

Illustrated portion (a) of FIG. 7 shows extended lines of edges detected by the edge detection unit 13, for example. Extended edge lines 72 converging at a left vanishing point 71 among the extended edge lines correspond to the left surface of the current object, and the extended edge lines 63 converging at the right vanishing point (not shown) correspond to the right surface of the current object. Illustrated portion (b) of FIG. 7 shows a process of calculating a plane equation of the right surface of the current object corresponding to the right vanishing point. That is, the surface information calculation unit 15, for example, may determine a middle line 73 positioned in the middle in the current object boundaries from among the extended edge lines converging at the right vanishing point, and a straight line equation of the middle line and an arbitrary point on the bottom line of the right surface of the current object. Then, by using the determined straight line equation of the middle line and the 3D coordinates of the bottom line, a plane equation of the right surface of the object may be calculated.

Figure 8:
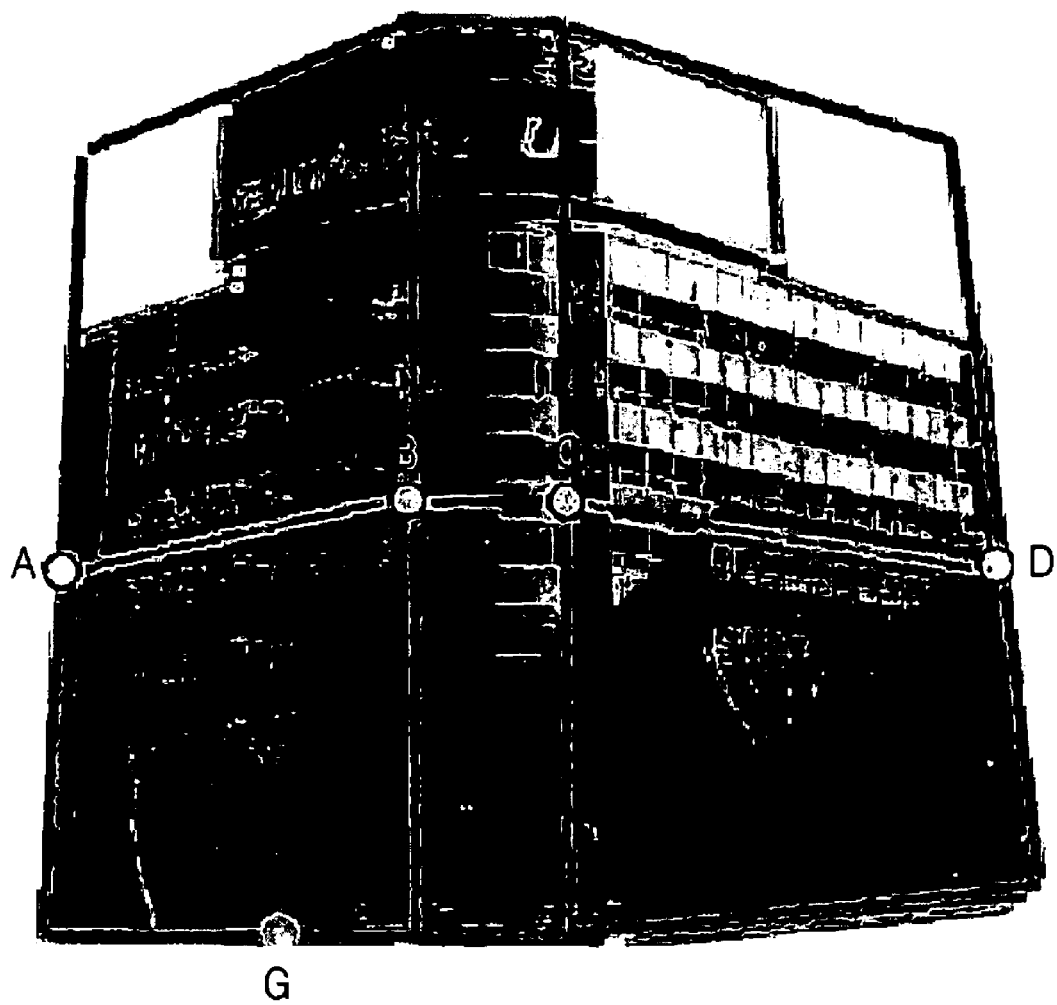
FIGS. 8 and 9 are illustrations explaining a method of calculating a plane equation of any one surface, such as by a surface information calculation unit illustrated in FIG. 1, according to an embodiment of the present invention.
Figure 9:
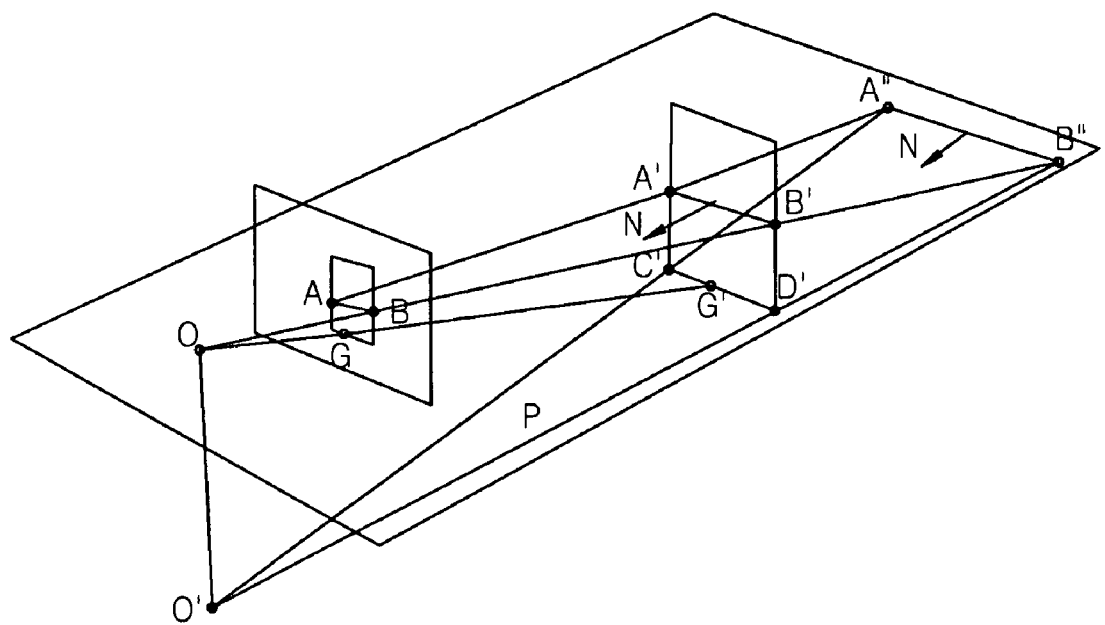

FIGS. 8 and 9 are illustrations explaining a method of calculating a plane equation of any one surface, e.g., by the surface information calculation unit 15 illustrated in FIG. 1, according to an embodiment of the present invention.

Referring to FIG. 8, the building illustrated in FIG. 8 is formed by three surfaces.

Points at which the boundaries of the three surfaces intersect with the middle lines of the three surfaces are indicated by A, B, C, and D. For example, the left surface from among the three surfaces can be determined by a line segment AB and a point G on the bottom line of the left surface. According to an embodiment, a method by which the surface information calculation unit 15, for example, calculates a plane equation of the left surface, by using the straight line equation of the line segment AB and the 3D coordinates of the point G, will now be explained in greater detail with additional reference to FIG. 9.

Referring to FIG. 9, the position of a camera in a 3D space is O.

Here, it may be assumed that the 3D space is a real world space in which a 2D photographic image was taken, and the position of the camera is the position of the camera from which the 2D photographic image was taken, and can be the very center of the 2D photographic image. In particular, it may further be assumed that the camera is a pin-hole camera and is capable of perfect projection. Since an actual camera is not a pin-hole camera, slight error may thus occur. A surface including a line segment A'B' is a surface of an actual building in a 3D space, and is projected as the surface of the building including the line segment AB in the focal length of the camera, i.e., a surface of the building in the 2D photographic image.

The extended lines of line segments OA and OB go through A' and B', respectively, of the surface of the building in the 3D space. Since the heights of line segments C'A' and D'B' relative to the ground are identical, D'B':OO'=C'A':OO' and OB': OB"=OA':OA". From this, it can be determined that the line segment A'B' is parallel to the line segment A"B". Since a surface C'A'B'D' of the building is perpendicular to the ground, a normal to the surface of the building is parallel to the ground. Accordingly, it can be known that a vector perpendicular to the line segment A"B" is a vector perpendicular to the surface of the building.

The surface information calculation unit 15, for example, may calculate an equation of a straight line OA from the 3D coordinates of the position O of the camera and the 3D coordinates of the intersection A of the boundary of the building and the middle line.

In addition, in this embodiment, the surface information calculation unit 15 may calculate an equation of a straight line OB from the 3D coordinates of the position O of the camera and the 3D coordinates of the intersection B of the boundary of the building and the middle line. In this case, the position O of the camera and the 3D coordinates of the intersections A and B can be estimated from 2D coordinates of the points in the 2D photographic image and the focal length of the camera.

Further, by using the thus calculated equation of the straight line OA, the surface information calculation unit 15 may calculate the 3D coordinates of the intersection A" of the straight line OA and the ground, and the intersection B" of the straight line OB and the ground, and from the thus calculated 3D coordinates of the intersections A" and B", calculate an equation of a straight line A"B". By using the thus calculated equation of the straight line A"B", the surface information calculation unit 15 may, thus, calculate a vector N perpendicular to the straight line A"B" existing on the ground.

The surface information calculation unit 15 may still further calculate an equation of a straight line OG, from the 3D coordinates of the position O of the camera and the 3D coordinates of the arbitrary point G on the bottom line of the building. By using the thus calculated equation of the straight line OG, the surface information calculation unit 15 may calculate the 3D coordinates of the intersection G' of the straight line OG and the 3D space ground. An equation of a surface can then be calculated if the 3D coordinates of any one point existing on the surface and a vector value perpendicular to the surface are given. That is, assuming that a point existing on a surface is (x0, y0, z0) and a vector n perpendicular to the surface is n=ai+bj+ck, the surface may be represented by the below Equation 1, for example.

$$a(x-x0)+b(y-y0)+c(z-z0)=0 \qquad \text{Equation 1}$$

Accordingly, by using the 3D coordinates of the thus calculated vector N and intersection G, the surface information calculation unit 15 may calculate a plane equation of the left surface of the building including the middle line AB.

The first 3D model generation unit 16 may further generate a resultant 3D model of the current object by using 2D photographic image data and surface geometric information, such as calculated by the surface information calculation unit 15. Here, the 2D photographic image data means 2D coordinates and textures of pixels forming the 2D photographic image, and the surface geometric information calculated by the surface information calculation unit 15 means the plane equation of the surface. More specifically, the first 3D model generation unit 16 may substitute 2D coordinates of the pixels forming the current object of the 2D photographic image, in the plane equation of each surface calculated by the surface information calculation unit 15, thereby calculating 3D coordinates, e.g., x, y, and z coordinates of the pixels forming each surface of the current object. The first 3D model generation unit 16 may further generate a 3D model of the 3D object by mapping the texture of the 2D photographic image corresponding to each of the pixels forming each surface of the current object on the 3D coordinates of the pixel.

Figure 10:
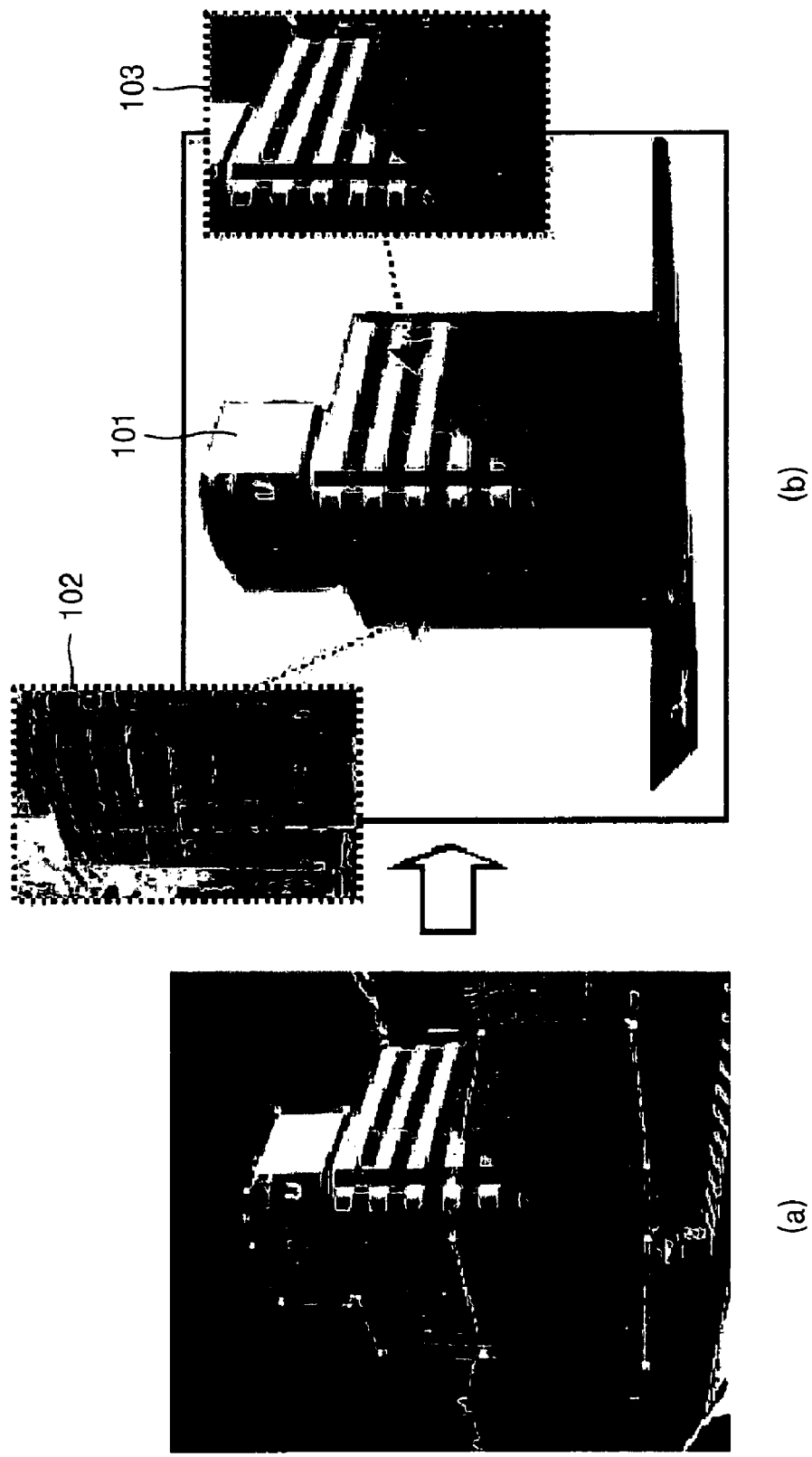
FIG. 10 is an illustration explaining a method of mapping texture, such as by a first 3D model generation unit illustrated in FIG. 1, according to an embodiment of the present invention.

FIG. 10 is an illustration explaining a method of mapping texture, such as by the first 3D model generation unit 16 illustrated in FIG. 1, according to an embodiment of the present invention.

Referring to illustrated portions (a) and (b) of FIG. 10, the first 3D model generation unit 16 may map a texture photographed by a camera facing each surface of a current object, on the 3D coordinates of each of pixels forming each surface of the current object. More specifically, in relation to the left surface 102 of the current object 101, the first 3D model generation unit 16 may set the position of the camera so that the camera can face the left surface 102, and then, the first 3D model generation unit 16 may map the texture of the 2D photographic image photographed by the camera at the thus set position, onto the left surface 102. In relation to the right surface 103 of the current object 102, the first 3D model generation unit 16 may set the position of the camera so that the camera can face the right surface 103 of the current object 101, and then, the first 3D model generation unit 16 may map the texture of the 2D photographic image photographed by the camera at the thus set position, onto the right surface 103.

If a current object is determinatively classified as a complex object, e.g., by the object classification 14, the second 3D model generation unit 17 may selectively generate a 3D model of the current object, by using a conventional 3D modeling method instead of by the 3D modeling method of the current embodiment described above. For example, in relation to objects that are classified as complex objects by the object classification unit 14, the second 3D model generation unit 17 may generate 3D models of the objects by using the auto pop-up algorithm described above in relation to the conventional technology.

Figure 11:
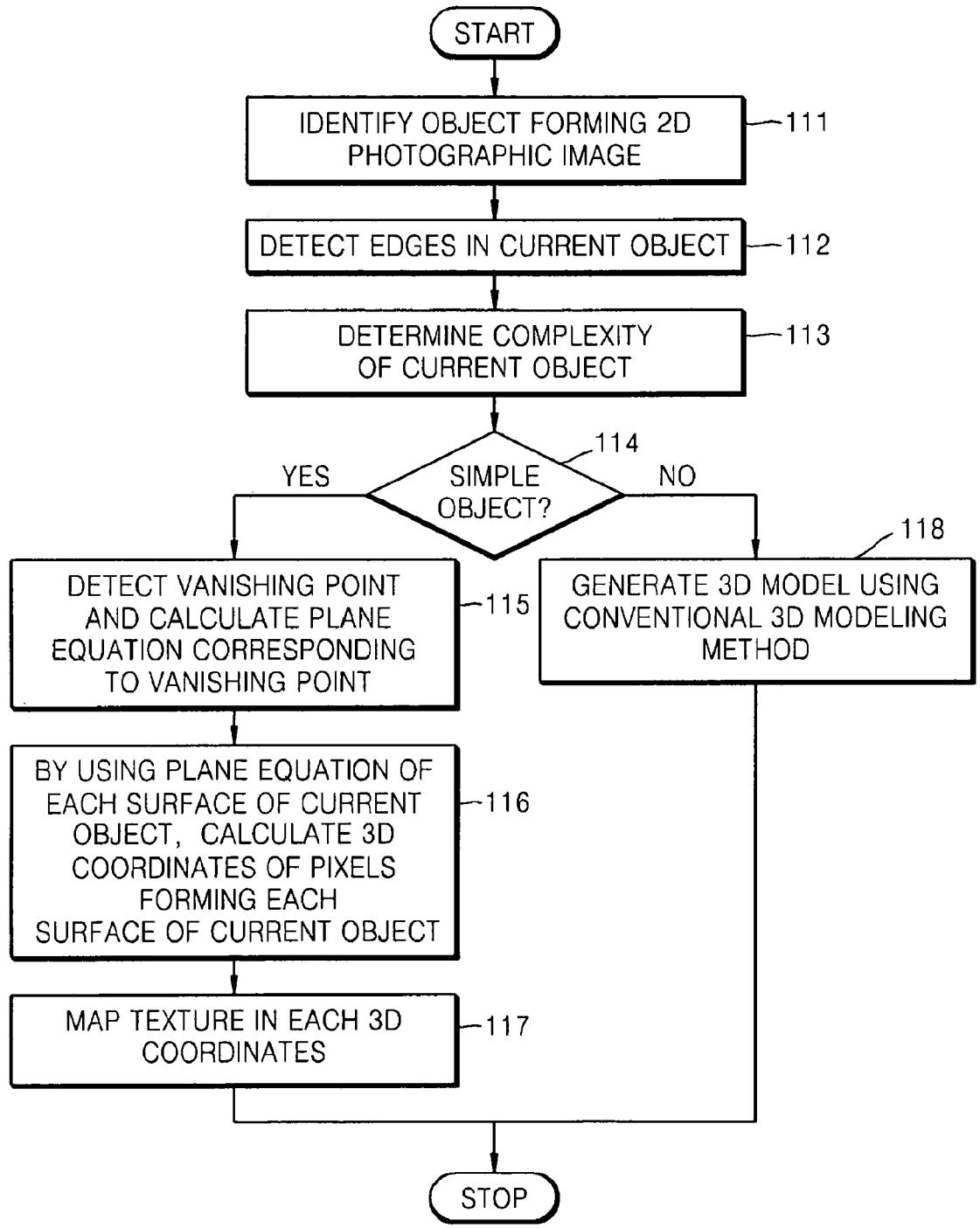
FIG. 11 illustrates a method of generating a 3D model, according to an embodiment of the present invention.

FIG. 11 illustrates a method of generating a 3D model, according to an embodiment of the present invention.

Referring to FIG. 11, in one embodiment, the method of generating a 3D model may include sequentially performed operations, e.g., in the system for generating a 3D model illustrated in FIG. 1. Accordingly, the contents described above in relation to the system for generating a 3D model illustrated in FIG. 1 may also be equally inclusive in the method of generating a 3D model according to such an embodiment, noting that further embodiments not specifically recited above are also available.

In operation 111, at least one or more objects forming a 2D photographic image may be identified based on at least one of changes in textures in the 2D photographic image and user input information, e.g., as input to the user interface 12.

In operation 112, edges may be detected as indicating points in which changes in luminous intensities are equal to or greater than a threshold, for example, in a current object from among at least one or more identified objects, such as those identified in operation 111.

In operation 113, the complexity of the current object may be determined based on the shapes of the extended lines of the edges detected in operation 112, and the current object may then be classified as one of a simple object and a complex object.

In operation 114, if the current object is classified as a simple object then operation 115 may be performed, while operation 118 may be performed if the current object is classified as a complex object.

In operation 115, at least one vanishing point at which the extended lines of the edges detected in operation 112 intersect each other may be detected, and a plane equation of a surface corresponding to the vanishing point may be calculated by using a straight line equation of a middle line, from among the extended edge lines converging at the detected vanishing point, and the coordinates of an arbitrary point on the bottom line of the surface corresponding to the vanishing point.

In operation 116, 2D coordinates, e.g., x and y coordinates, of pixels forming the current object of the 2D photographic image may then be substituted in the plane equation of each surface calculated in operation 115, thereby calculating the 3D coordinates, e.g., x, y, and z coordinates, of the pixels forming each surface of the current object.

In operation 117, a 3D model of the 3D object may then be generated by mapping the texture of the 2D photographic image corresponding to each of the pixels forming each surface of the current object onto the 3D coordinates of the pixel.

In operation 118, the 3D model of the current object may be selectively generated by using a conventional 3D modeling method instead of by using a 3D modeling method according to an embodiment of the present invention.

Figure 12:
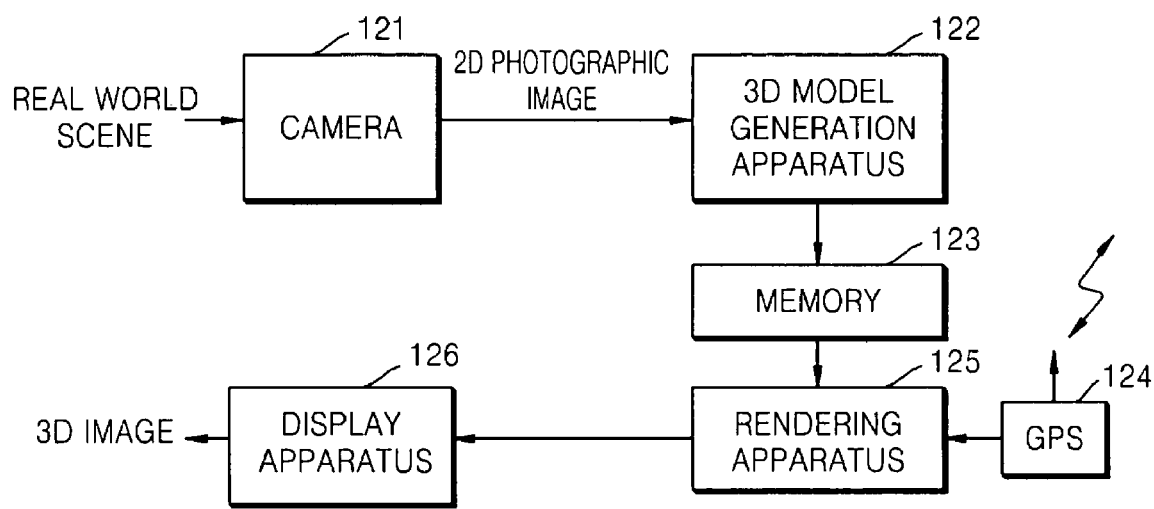
FIG. 12 illustrates a navigation system, for example, as a system generating a 3D model, such as illustrated in FIG. 1, according to an embodiment of the present invention.

FIG. 12 illustrates a navigation system as the system for generating the 3D model illustrated in FIG. 1, according to an embodiment of the present invention. Briefly, though described herein as a navigation system, an embodiment of the present system may be implemented as other systems with or without such navigation capabilities.

Referring to FIG. 12, the navigation system may include a camera 121, a 3D model generation apparatus 122, a memory 123, a global positioning system (GPS) 124, a rendering system 125, and a display system 126, for example. In combination with the other elements, the 3D model generation apparatus 122 may implement aspects of the aforementioned system for generating a 3D model illustrated in FIG. 1, which is described in detail above, and therefore an explanation thereof will be omitted here, again noting that the navigation system of FIG. 12 may merely be another embodiment of the system for generating the 3D model illustrated in FIG. 1.

Accordingly, with that being said, the camera 121 may capture a scene in the real world, for example, thereby generating a 2D photographic image. The navigation system may further also be a mobile system, such that the camera 121 is potentially mounted on the front part of such a mobile body, e.g., a car, so that scenes corresponding to the moving direction of the mobile body can be photographed.

Based on a point at which extended lines of edges, which correspond to points in which changes in the image information are equal to or greater than a threshold in an object, from among objects forming the 2D photographic image, e.g., as generated by the camera 121, intersect each other, the 3D model generation apparatus 122, for example, may calculate geometric information of a surface of the object, for thereby generating a 3D model of the object.

The memory 123 may further store the 3D model generated by the 3D model generation apparatus 122. Accordingly, in the memory 123, 3D models of 2D photographic images photographed by using the camera 122 may be stored, potentially among other 3D models.

However, as noted, a person of ordinary skill in the art should understand that such a navigation system according to the current embodiment may merely include only the memory 123 storing pre-generated 3D models, e.g., generated in advance by another device other than the navigation system. However, since a calculation for obtaining 3D geometric information is simple, e.g., for the 3D model generation apparatus 122, according to this embodiment, the 3D model generation apparatus 122 may not need a large capacity memory for storing 3D models of all areas that can be visited by the mobile body. In this case, in an embodiment, the 3D model generation apparatus 122, for example, may directly perform 3D modeling of a 2D photographic image of a place where the mobile body is currently positioned, and delete 3D models of areas far from the mobile body from among the 3D models stored in the memory 123, thereby operating only with a small capacity memory, noting that alternative embodiments are equally available.

The GPS 124, for example, may be used to receive current position information of the navigation system mounted on/in such a mobile body, from at least one or more GPS satellites, also noting that alternative positioning systems are available.

The rendering system 125 may further extract such a 3D model corresponding to the current position information of the navigation system, received by the GPS 124, from among 3D models stored in the memory 123, and render the thus extracted 3D model on a 2D plane corresponding to the moving direction of the mobile body on which the navigation system is mounted. Here, for example, the system for generating the 3D model illustrated in FIG. 1 may merely be a system without such a camera, or even the GPS 124, that renders or renders and displays such generated 3D models.

The display system 125 may then display such a result of the rendering performed by the rendering system 125.

Figure 13:
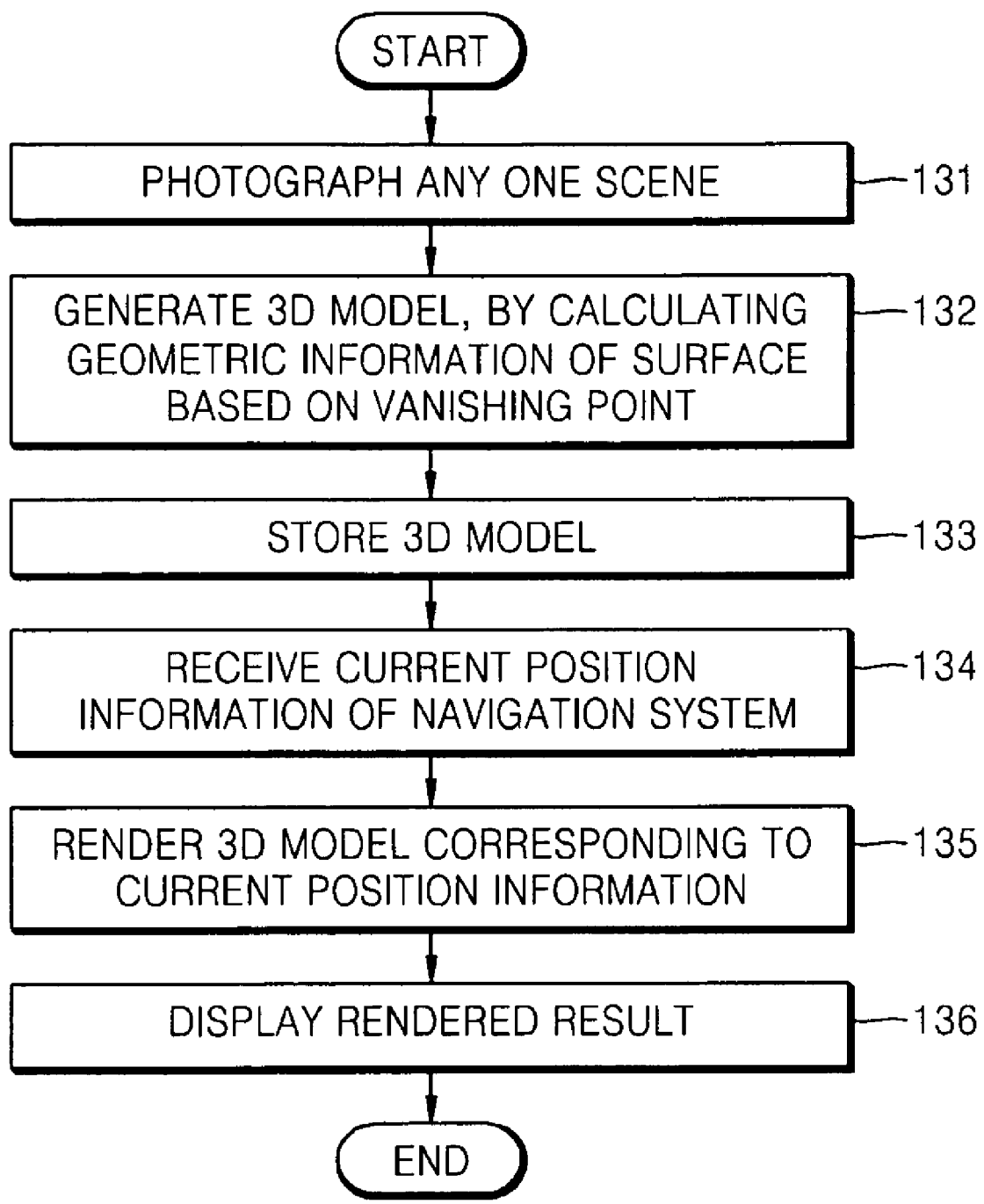
FIG. 13 illustrates such a navigation method, according to an embodiment of the present invention.

Thus, in view of at least the above, FIG. 13 illustrates a navigation method, according to an embodiment of the present invention.

Referring to FIG. 13, the navigation method may include operations performed in a time series, e.g., in the navigation system illustrated in FIG. 12. Accordingly, although omitted below, aspects described above in relation to the navigation system illustrated in FIG. 12 may also be equally applied to the navigation method according to the current embodiment, again noting that alternative embodiments are also available.

In operation 131, a 2D photographic image may be generated by photographing a scene in the real world.

In operation 132, based on a point at which extended lines of edges, which correspond to points in which changes in the image information are equal to or greater than a threshold in an object, from among objects forming the 2D photographic image generated in operation 131, intersect each other, geometric information of a surface of the object may be calculated, thereby generating a 3D model of the object.

In operation 133, the 3D model generated in operation 132 may be stored.

In operation 134, current position information, e.g., of the navigation system mounted on a mobile body, may be received from at least one or more GPS satellites.

In operation 135, a 3D model corresponding to the received current position information may be extracted, from among 3D models including the 3D model stored in operation 133, and rendered on a 2D plane corresponding to the moving direction of the example mobile body on which the navigation system is mounted.

In operation 136, the rendered results may be displayed.

According to one or more embodiments of the present invention, by using linear equations of at least one or more extended edge lines converging at a vanishing point for any one object in a 2D photographic image, a plane equation of a surface corresponding to the vanishing point may be calculated, and by using the calculated plane equation, a 3D model of the object may be generated. In this way, calculation of 3D geometric information in a process of generating a 3D model can be simplified.

Further, according to one or more embodiments of the present invention, by using a straight line equation of an extended edge line positioned closest to the center portion of an object, among extended edge lines converging at a vanishing point, such a plane equation of the surface of the object may be calculated, thereby accurately generating a 3D model even when an example car exists between a building and the ground, noting that embodiments of the present invention overcome drawbacks from further potentially distracting elements, in addition to such a car existing between a building and the ground.

In addition, according to one or more embodiments of the present invention, the complexity of an object may be determined based on shapes of edges in the object, and according to the complexity, an aspect of the present invention is a selective employment of the geometric information calculation method according to one or more embodiments of the present invention or a conventional 3D modeling method or alternate 3D modeling method developed in the future, thereby providing an optimal 3D modeling process.

Still further, as described above, according to one or more embodiments of the present invention, calculation in the 3D modeling method is simple and accurate. Accordingly, when the method is directly applied as a navigation system, the capacity of a memory storing 3D models can be reduced, and a more accurate navigation screen can be provided to users.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of generating a 3-dimensional (3D) model comprising:
   detecting edges corresponding to points where changes in image information are equal to or greater than a threshold in an object of a 2D image;
   by using geometric information of an extended edge line determined to be positioned closest to a center of the object, from among extended lines of the detected edges converging at at least one vanishing point that is a point at which the extended edge lines intersect each other, calculating a plane equation of a surface of the object corresponding to the at least one vanishing point; and
   by using 2D image data and the calculated surface plane equation, generating a 3D model of the object.

2. The method of claim 1, wherein the geometric information of the extended edge line is a straight line equation of the extended edge line.

3. The method of claim 2, wherein in the calculating of the plane equation of the surface of the object, the plane equation of the surface is calculated by using the straight line equation of the extended edge line and the coordinates of one point on the surface.

4. The method of claim 1, wherein if a plurality of vanishing points exist, in the calculating of the plane equation of the surface of the object, the plane equation of a first surface of the object corresponding to a first vanishing point is calculated by using the geometric information of an extended edge line converging at the first vanishing point from among the plurality of vanishing points, and the plane equation of a second surface of the object corresponding to a second vanishing point is calculated by using the geometric information of an extended edge line converging at the second vanishing point from among the plurality of vanishing points.

5. The method of claim 1, further comprising identifying at least one object forming the 2D image, based on at least one of changes in image characteristics in the 2D image and user input information,
   wherein in the detecting of the edges, edges corresponding to points where changes in the image information are equal to or greater than the threshold are detected in any one object among the identified objects.

6. The method of claim 1, wherein the 2D image data is 2D coordinates and textures of pixels forming the 2D image, and
   in the generating of the 3D model of the object, 3D coordinates of the pixels forming the surface are calculated by substituting the 2D coordinates in the plane equation of the surface, and a texture corresponding to each pixel is mapped onto the calculated 3D coordinates of the pixel.

7. The method of claim 6, wherein in the generating of the 3D model of the object, a texture photographed by a camera facing each surface of the current object is mapped onto the 3D coordinates of the pixels forming each surface of the object.

8. A method of generating a 3-dimensional (3D) model comprising:
   detecting edges corresponding to points where changes in image information are equal to or greater than a threshold in an object of a 2D image;
   by using geometric information of extended lines of the detected edges converging at at least one vanishing point that is a point at which the extended edge lines intersect each other, calculating a plane equation of a surface of the object corresponding to the at least one vanishing point; and
   by using 2D image data and the calculated surface plane equation, generating a 3D model of the object,
   further comprising determining the complexity of the object based on the shapes of the detected edges, wherein according to the determined complexity of the object, the plane equation of the surface is selectively calculated.

9. A navigation method in a navigation system comprising:
   based on a point at which extended lines of edges corresponding to points where changes in image information are equal to or greater than a threshold in an object of a 2D image, intersect each other, calculating a plane equation of a surface of the object, thereby generating a 3D model in relation to the object; and extracting a 3D model corresponding to the current position information of the navigation system, from among 3D models, including the generated 3D model, and rendering the extracted 3D model on a 2D plane corresponding to the moving direction of a mobile body on which the navigation system is mounted, wherein the plane equation of the surface of the object is calculated by using the geometric information of an extended edge line determined to be positioned closest to a center of the object, from among the extended edge lines converging at the vanishing point.

10. A modeling method, comprising:

identifying a object within an image by detecting edges within the image;

determining a complexity of the identified object based upon detected surface orientations of the identified object relative to a defined surface of the image;

selectively, based upon the determined complexity, generating a plane equation of one or more surfaces for a 3D model by identifying one or more vanishing points for one or more corresponding surfaces, respectively, of the identified object and respectively analyzing the identified one or more vanishing points relative to respective determined points of the one or more corresponding surfaces of the image; and generating the 3D model by combining the one or more surfaces in a 3D space.

11. A modeling method, comprising:

identifying a object within an image by detecting edges within the image;

generating a plane equation of one or more surfaces for a 3D model by identifying one or more vanishing points for one or more corresponding surfaces, respectively, of the identified object and respectively analyzing the identified one or more vanishing points relative to respective determined points of the one or more corresponding surfaces of the image and a corresponding determined line within each of the one or more corresponding surfaces, with each corresponding determined line within each respective surface being a mid-line across the respective surface between two edge lines substantially perpendicular to a line substantially parallel with an identified bottom surface of the image; and generating the 3D model by combining the one or more surfaces in a 3D space.

* * * * *